(12) United States Patent
Brewer et al.

(10) Patent No.: US 12,479,572 B2
(45) Date of Patent: Nov. 25, 2025

(54) ACTUATION SYSTEM

(71) Applicant: Claverham Limited, Solihull (GB)

(72) Inventors: Paul Brewer, Bristol (GB); Reg Raval, Bristol (GB); Andrew Miller, Bristol (GB)

(73) Assignee: CLAVERHAM LIMITED, Solihull (GB)

( * ) Notice: Subject to any disclaimer, the term of this patent is extended or adjusted under 35 U.S.C. 154(b) by 84 days.

(21) Appl. No.: 17/574,826

(22) Filed: Jan. 13, 2022

(65) Prior Publication Data

US 2022/0227484 A1 Jul. 21, 2022

(30) Foreign Application Priority Data

Jan. 15, 2021 (EP) .................................... 21275004

(51) Int. Cl.
*B64C 13/50* (2006.01)
*B64C 13/30* (2006.01)

(52) U.S. Cl.
CPC ............ *B64C 13/505* (2018.01); *B64C 13/30* (2013.01)

(58) Field of Classification Search
CPC ....... B64C 13/505; B64C 13/30; B64C 13/32; B64C 13/341; B64C 13/42; B64D 2045/001
See application file for complete search history.

(56) References Cited

U.S. PATENT DOCUMENTS

| | | | |
|---|---|---|---|
| 3,608,430 A * | 9/1971 | Headlund | F15B 18/00 91/509 |
| 3,640,183 A * | 2/1972 | Koch | B64C 13/00 267/179 |
| 4,244,541 A * | 1/1981 | Dorn | B64C 13/343 244/221 |
| 6,776,376 B2 | 8/2004 | Collins | |
| 8,567,715 B2 | 10/2013 | Fervel et al. | |
| 8,746,614 B2 * | 6/2014 | Heintjes | B64D 45/0005 244/99.2 |
| 9,190,942 B2 | 11/2015 | Polcuch | |
| 9,708,054 B2 | 7/2017 | Huynh et al. | |
| 10,483,880 B2 | 11/2019 | Peck, Jr. et al. | |
| 11,235,862 B2 * | 2/2022 | Miyazono | B64C 13/50 |
| 2013/0327887 A1 * | 12/2013 | Dyckrup | B64C 13/341 244/99.3 |
| 2014/0175216 A1 * | 6/2014 | Ishihara | B64C 13/36 244/99.6 |
| 2018/0362147 A1 * | 12/2018 | Huynh | B64C 9/20 |

(Continued)

FOREIGN PATENT DOCUMENTS

EP 3617060 A1 3/2020

OTHER PUBLICATIONS

European Search Report for Application No. 21275004.6, mailed Jul. 2, 2021, 7 pages.

*Primary Examiner* — Kimberly S Berona
*Assistant Examiner* — Nevena Aleksic
(74) *Attorney, Agent, or Firm* — CANTOR COLBURN LLP

(57) ABSTRACT

An actuation system for an aircraft control surface. The actuation system may include a rotary driver and three or more actuator modules, and each actuator module may be connected to the rotary driver such that the three or more actuator modules are configured to drive rotation of the rotary driver in combination.

10 Claims, 5 Drawing Sheets

(56) References Cited

U.S. PATENT DOCUMENTS

| | | | | |
|---|---|---|---|---|
| 2019/0023378 A1* | 1/2019 | Miller | ............... | B64C 13/16 |
| 2020/0307775 A1* | 10/2020 | Tzabari | ............... | B64C 3/50 |
| 2020/0407080 A1* | 12/2020 | Good | ............... | B64C 9/26 |
| 2021/0245865 A1* | 8/2021 | Alvizures | ............... | B64C 9/02 |

\* cited by examiner

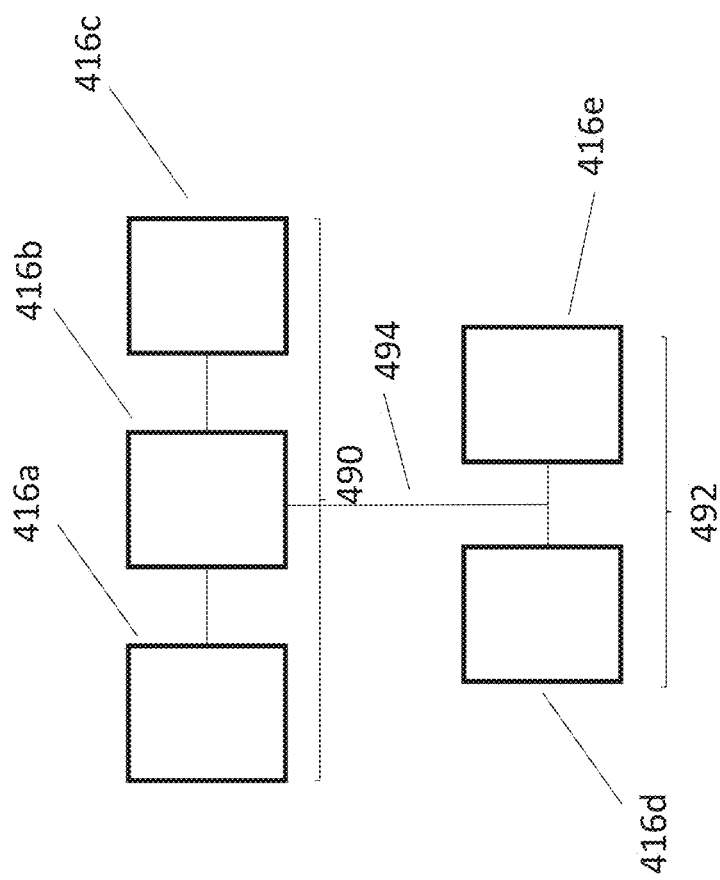

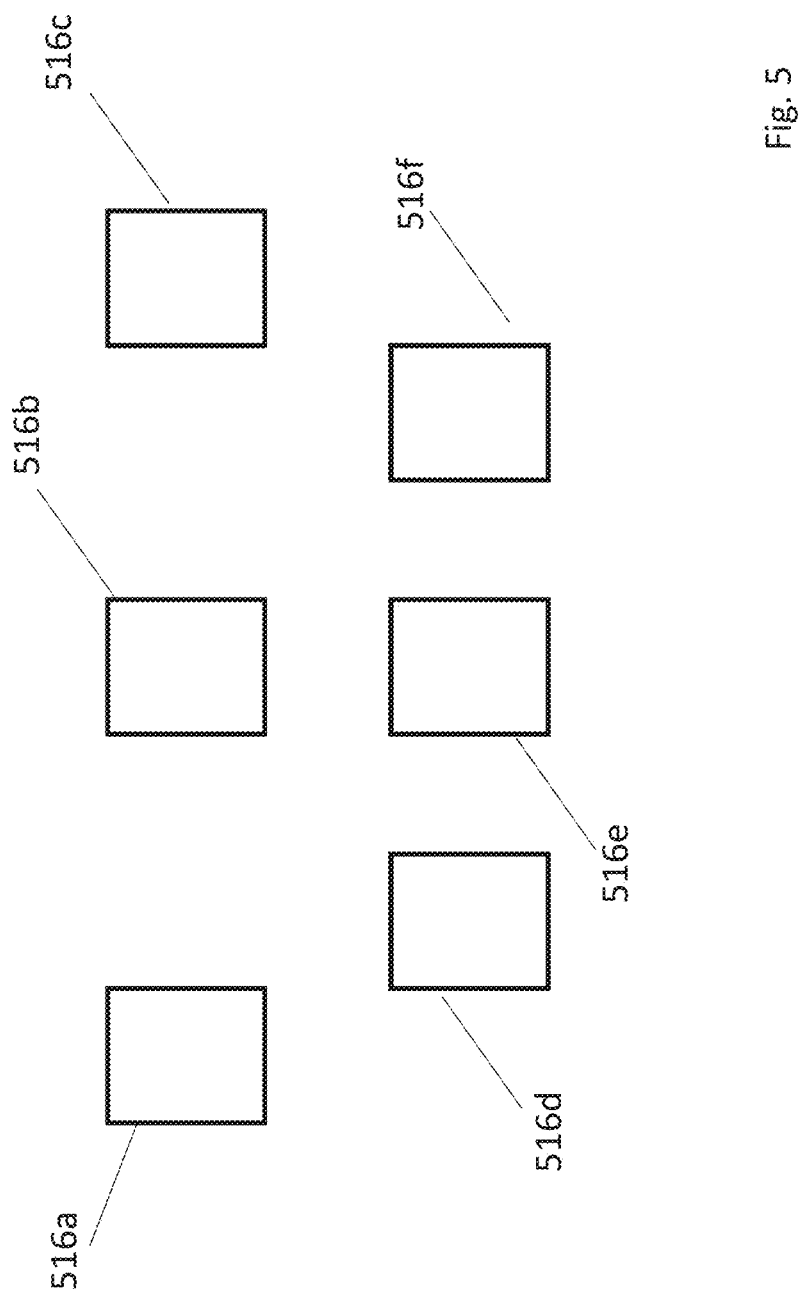

ACTUATION SYSTEM

CROSS-REFERENCE TO RELATED APPLICATIONS

This application claims priority to European Patent Application No. 21275004.6 filed Jan. 15, 2021, the entire contents of which is incorporated herein by reference.

TECHNICAL FIELD

The present disclosure relates to actuation systems and in particular to actuation systems using electromechanical linear actuators. Such actuators may be used to actuate control and other surfaces in aircraft, for example slats, flaps, thrust reverser doors and so on.

BACKGROUND

Surfaces such as control surfaces are commonly provided on aircraft wings. Actuators may be used to activate the control surfaces.

Many modern aircraft require actuation arrangements that allow thin wing configurations. Traditionally however, actuators large enough to deliver the required performance to a control surface are too large to fit within the section of a thin aircraft wing. Because of this, the actuators are housed in blisters provided on the wing but these cause drag and reduce the aerodynamic efficiency of the aircraft.

In addition, there is a drive within the aircraft industry to use electronic actuators whenever possible. However, linear electromechanical actuators are prone to jamming and other failures which can ground an aircraft or be dangerous if they occur in flight.

There is therefore a need to improve existing actuation arrangements for use with aircraft control surfaces.

SUMMARY

According to a first aspect of this disclosure, an actuation system is provided disclosed. The system includes a rotary driver three or more actuator modules. Each actuator module comprises an electromechanical linear actuator and is connected to the rotary driver such that the three or more actuator modules are configured to drive rotation of the rotary driver in combination.

The actuation system may drive the rotary driver using the sum of the output of the three or more actuator modules. Thus, the size and weight of each of the three or more actuator modules may be significantly smaller than would be required if only a single actuator were used.

Each actuator module may further comprise a lever arm connected between the electromechanical linear actuator and the rotary driver.

Each actuator module may further comprise a breakout mechanism configured to operably disconnect the actuator module from the rotary driver if a force exerted on the breakout mechanism exceeds a desired value.

The breakout mechanism may comprise an overload clutch, a shear pin or a collapsing link.

The electromechanical linear actuators in the three or more actuator modules may be sized such that a required driving force is supplied to the rotary driver even when one or more of the actuator modules fails or jams.

The three or more actuator modules may be arranged in a single row.

The three or more actuator modules may be arranged in two or more rows, wherein each of the two or more rows may be operably connected to another row by a linkage.

The system may comprise six or more actuator modules arranged in two discrete banks of actuator modules in a row which form a V shape.

An additional linkage mechanism may be provided between the rotary driver and a remote mechanism configured to be actuated by the actuation system.

A force multiplier link may be provided between each actuator module and the rotary driver.

The rotary driver may comprise a shaft.

The rotary driver may comprise a belt or chain.

The actuation system may be an aircraft control surface actuation system.

From a further aspect of the disclosure, an aircraft wing may be provided. The wing includes a control surface adapted to move from a first position to a second position and any actuation system as claimed or disclosed herein. The rotary driver of the actuation system is adapted to drive the movement of the control surface from the first position to the second position.

The actuation system may be housed inside the wing.

Features described in relation to one aspect of this disclosure may of course be applied to the further aspects thereof. In general, features of any example described herein may be applied wherever appropriate to any other example described herein. Where reference is made to different examples or sets of examples, it should be understood that these are not necessarily distinct but may overlap.

BRIEF DESCRIPTION OF DRAWINGS

Certain examples of the disclosure will now be described by way of example only and with reference to the accompanying drawings in which:

FIG. 4 is a schematic representation of an example actuation system in which actuator modules are positioned in two rows; and FIG. 5 is a schematic representation of an example actuation system in which actuator modules form a V shape.

DETAILED DESCRIPTION

Figure 1:
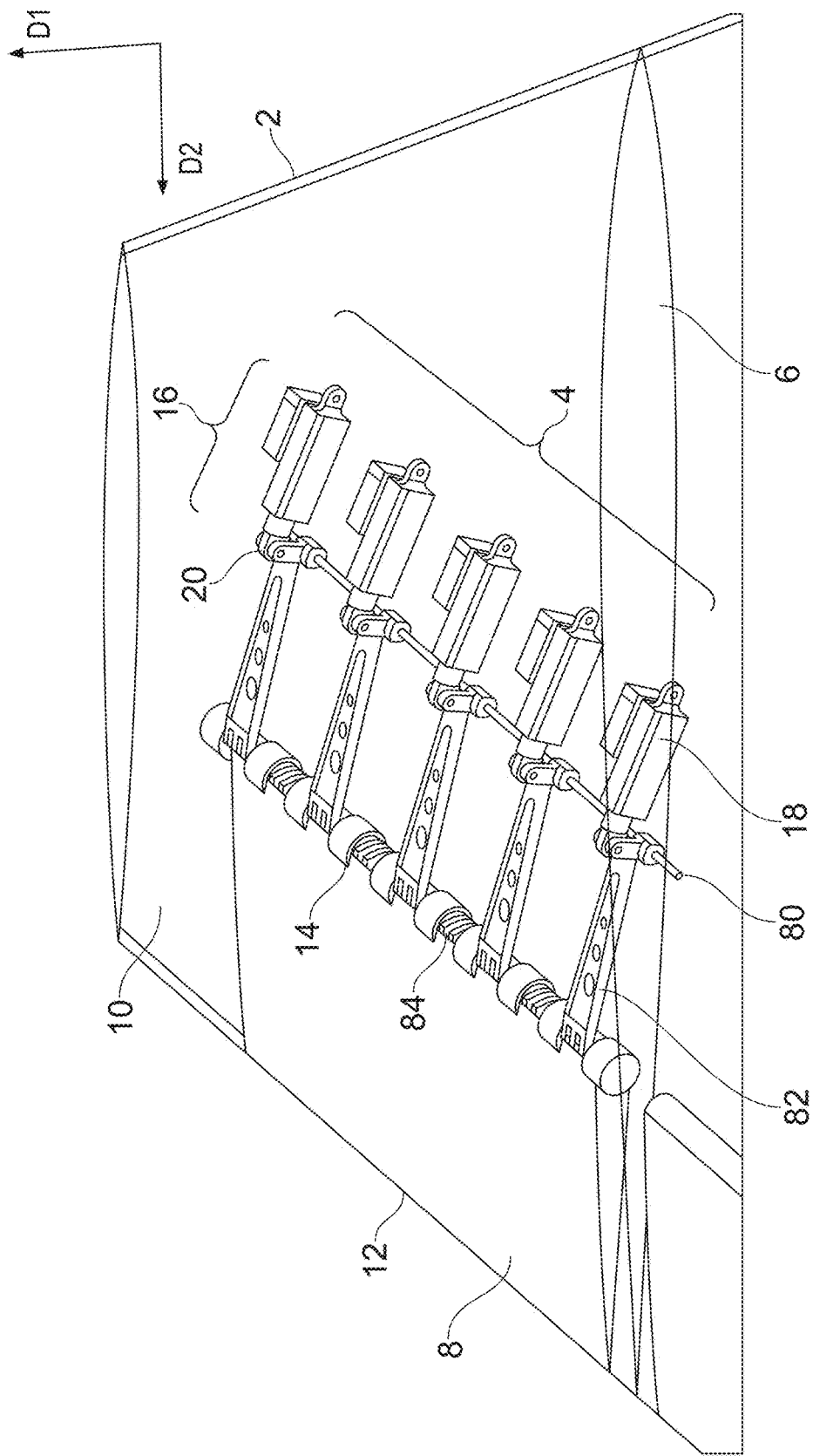
FIG. 1 shows a schematic perspective view of an aircraft wing including an actuation system according to the disclosure.

FIG. 1 shows a schematic perspective view of an aircraft wing 2 including an actuation system 4 according to an example of the disclosure.

An aircraft wing 2 typically comprises a hollow section and extends outwardly from a body (not shown) of the aircraft in a first lengthwise direction D1. The wing has a width in a second direction D2 perpendicular to the first direction D1. The width of the wing 2 may decrease gradually as the wing extends outwardly from the aircraft in the first direction D1. At any point along the wing 2 in the first direction D1, the wing has an airfoil shape 6 in cross section.

A control surface 8 is provided in a surface 10 of the wing 2. In the example shown, the control surface 8 is provided adjacent a leading edge 12 of the wing 2. The control surface 8 extends across the surface 10 along a portion of the length and a portion of the width of the wing. The control surface 8 is configured to rotate about a hinge 14 in the surface 10 of the wing to open outwardly from the surface 10 of the wing when actuated. It will be appreciated however that the control surface 8 may have any desired configuration and any desired location depending on the design and intended use thereof.

The actuation system 4 is configured to actuate the control surface 8 to move outwardly from the surface 10 of the wing (to open) or to move back towards the surface 10 of the wing (to close) as required. A control system (not shown) may be provided to control the actuation system 4.

As seen in FIG. 1, the actuation system 4 is sized so as to be housed within the hollow section of the wing 2 when the control surface 8 is closed. The actuation system 4 comprises any suitable number of actuator modules 16 arranged to drive rotation of the control surface 8 about the hinge 14 as will be described further below in relation to FIG. 2. Typically, at least three independent actuator modules (or, in another example, at least four independent actuator modules) will be required in any actuation system according to the disclosure to allow for sufficient redundancy in the event of a failure of one of the actuator modules.

Each actuator module 16 comprises a linear electromechanical actuator 18 and a lever arm 20. In the example shown, five actuator modules 16 are provided and are arranged in a row along a line extending substantially parallel to the hinge 14 within the wing 2. Thus, in the example shown, each linear electromechanical actuator 18 will be evenly spaced along the line extending substantially parallel to the hinge 14 and will be configured to provide linear movement in a direction substantially perpendicular to the hinge 14. In other examples, any suitable number of actuator modules for a desired application may be provided and the linear electromechanical actuators may be arranged in other configurations, such as a V-shape, as will be described further below. The linear electromechanical actuators 18 are connected to a power supply (not shown) and/or a controller (not shown).

Figure 2:
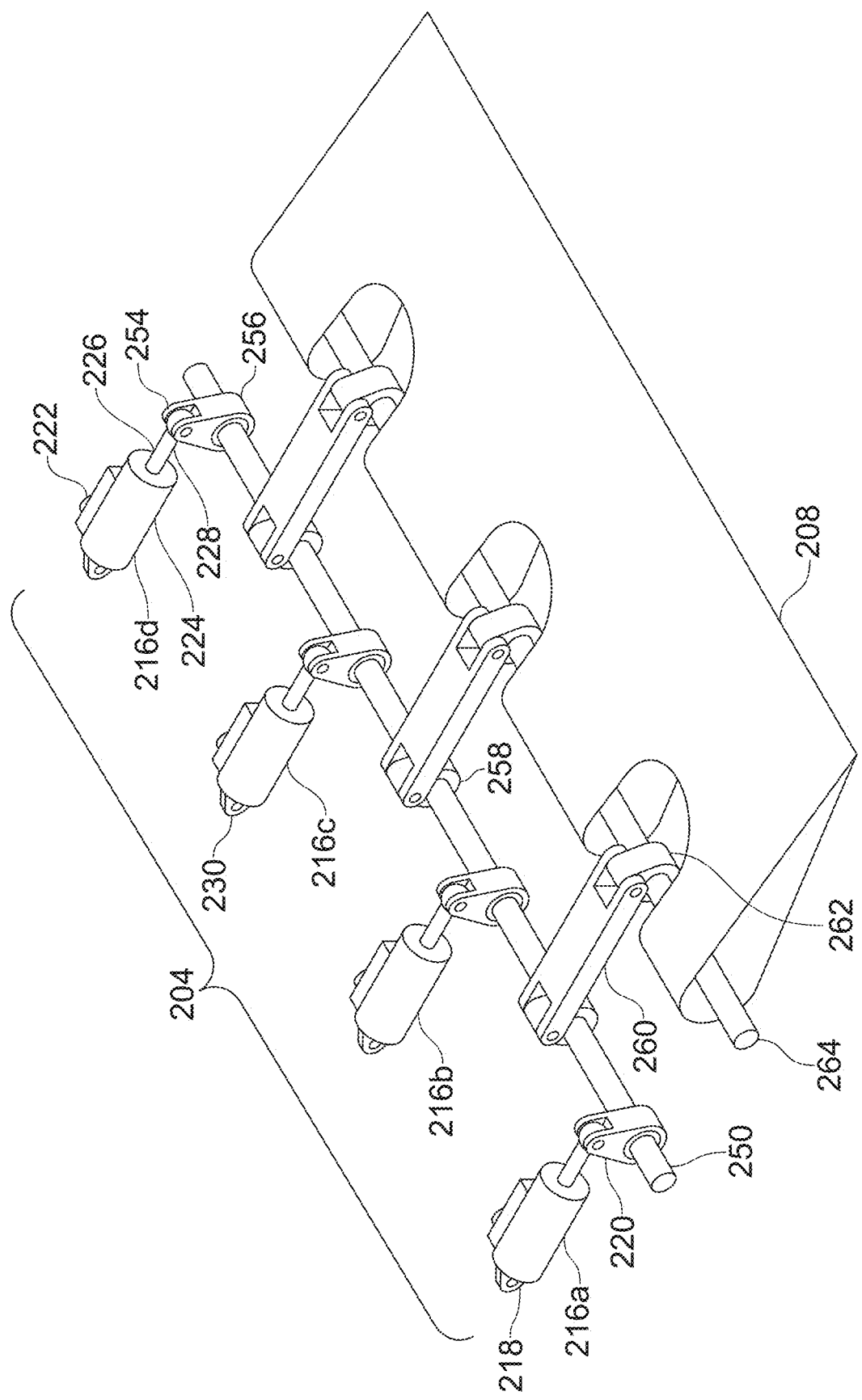
FIG. 2 shows a schematic perspective view of an example actuation system according to the disclosure.

Another example actuation system according to the disclosure is shown in FIG. 2. The actuation system 204 comprises four actuator modules 216a-d and a rotary driver, an output shaft 250 in this example. The actuator modules 216a-d are arranged in a row extending along the output shaft 250 and may be evenly spaced from one another. Each actuator module 216a-d includes a linear electromechanical actuator 218 and a lever arm 220.

The linear electromechanical actuator 218 may be any suitable type of actuator and will typically comprise an electric motor 222, a cylindrical housing 224 including a screw mechanism (not shown) and an actuator arm 226 adapted to move in and out of the cylindrical housing in an axial direction when the electric motor 222 drives the screw mechanism such that an axial distance of a free end 228 of the actuator arm 226 from the cylindrical housing 224 may be varied. When installed and in use, each actuator module will be fixed or earthed relative to the aircraft wing 2, for example by a fixing mechanism 230 provided on the cylindrical housing 224 of each linear electromechanical actuator 218.

The lever arm 220 is configured to convert the linear motion of the actuator arm 226 to rotary motion and may take any suitable form to achieve this. In the example of FIG. 2, the lever arm 220 comprises a first end 254 connected to the free end 228 of the actuator arm 226. The lever arm 220 is also connected to the output shaft 250 at a location 256 removed from the first end 254 such that linear motion of the actuator arm 226 causes the lever arm 220 to pivot and drive rotary motion of the output shaft 250.

As each of the four actuator modules 216a-d are synchronised and are connected to the output shaft 250 by their respective lever arm 220, the actuation system 204 will sum the torque output from each of the four actuator modules 216a-d such that the rotation of the output shaft 250 is driven equally by each of the four actuator modules 216a-d. Thus, the total torque output required to drive the output shaft 250 (for example, to move a control surface against a load acting thereon) is provided by summing the force output from each of the four actuator modules 216a-d. As a consequence, the force output required from each of the actuator modules may be only one quarter of the force output that would be required if a single actuator were used to drive the output shaft 250. Further, even when the actuation system is designed to include significant redundancy, the force output required from each of the actuator modules will be less than (for example, one half or one third of) the force output that would be required if a single actuator were used to drive the output shaft 250. As a result, each actuator module may use a much smaller, lighter linear electromechanical actuator than would be required if a single actuator were used. Thus, the actuation system may be configured to fit within a constrained envelope such as in a thin aircraft wing.

In the example of FIG. 2, each linear electromechanical actuator in the actuation system is of identical size and the linear displacement of each linear mechanical actuator in use will be synchronised and equal. However, if desired it would be possible to use two or more different sizes of linear electromechanical actuator and to adjust the actuation system (for example, the shape of the lever arms) such that the rotational velocity of each lever arm is equal and synchronised during operation.

It will be appreciated that the output shaft 250 could be configured to be a part of the control surface 8 so as to directly drive the rotation of the control surface 8. In the example of FIG. 2 however, three further lever arms 258 are provided on the output shaft 250 so as to rotate therewith. The further lever arms 258 are connected via respective linkages 260 and additional lever arms 262 to the control surface 208 hinge 264 so as to drive the opening and closing of the control surface. It will be appreciated that the additional linkage mechanism, in this example comprising the further lever arms 258 and the linkages 260, may enable the actuator modules 216a-d to be positioned further from a remote mechanism to be actuated by the actuator modules. For example, the actuator modules 216a-d of the example may be positioned further from the control surface 208 within an aircraft wing. This may be advantageous for the envelope required to receive the actuator modules 216a-d relative to the shape of the wing 2. It will further be appreciated that, in various examples, the additional linkage mechanism could be rigid or flexible or use a combination of rigid and flexible parts (such as rigid metal plates and flexible belts).

Figure 3:
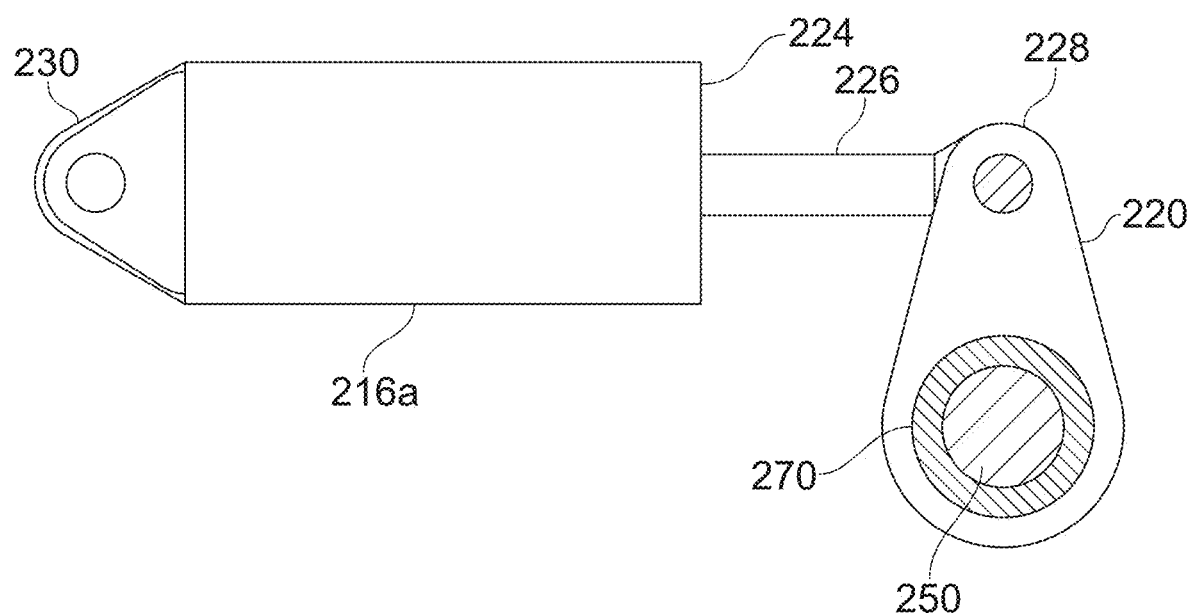
FIG. 3 shows a schematic cross section through part of an actuator module according to the disclosure.

FIG. 3 shows a schematic cross section through part of one of the actuator modules 216a of FIG. 2. As seen in FIG. 3, a breakout mechanism 270 is provided in the lever arm 220. If the actuator module 216a jams or fails, for example due to the actuator arm of the electromechanical actuator becoming stuck, the breakout mechanism 270 may cause the actuator module 216a to be operably disconnected from the output shaft 250 if the force exerted by the failed or jammed actuator module on the breakout mechanism exceeds a predetermined amount. In the example shown, the breakout mechanism 270 may comprise an overload clutch extending around the output shaft 250 between the output shaft 250 and the lever arm 220. In alternative examples, any suitable type of breakout mechanism connecting the output shaft 250 to the lever arm 220 could be used. Examples include one or more shear pins or a collapsing link.

The breakout mechanism 270 can cause the actuator module 216a to be operably disconnected from the output shaft 250 at any stage in the travel of the actuator arm 226 of the electromechanical actuator. Thus, the actuator module 216a can be operably disconnected from the output shaft 250 when the actuator arm 226 is fully extended, fully retracted or at any point between the fully extended and fully retracted positions.

It will be understood that, in the event of one of the actuator modules 216a-d being operably disconnected from the output shaft 250, the remaining actuator modules will continue to drive the output shaft 250. The actuation system may be designed with a high level of redundancy for the output required such that, in the event of a jam or failure of one or more of the actuator modules 216a-d, the remaining actuator modules will operate to provide the required combined output to drive the output shaft 250. In one example of the disclosure, the actuation system may be designed to include four or five actuator modules sized such that only three actuator modules are required to provide the required driving force on the output shaft.

Different modes of failure of an actuator module in the actuation system according to the disclosure are possible. In one example, if input signal or power to an actuator module is lost, the actuator module may continue to follow the movement of the other modules as it will be driven by the output shaft 250 moving the lever arm 220 as it rotates. In this instance, the force exerted by the failed actuator module on the breakout mechanism may be low and so the actuator module may remain connected to the output shaft 250. In an alternative, one actuator module may lose synchronisation with the other actuator modules in the actuation system. In this case, the output shaft 250 may act to force the actuator module back into synchronisation with the other actuator modules. However, if the error in synchronisation is detected by the controller, a power supply to the failed actuator module may be cut or the controller could act to correct the synchronisation of the failed actuator module. Thus again, the breakout mechanism might not be activated in this instance.

In the event of an actuator module becoming jammed however, the actuator module would be unable to move. The other actuator modules would continue to drive the output shaft such that the force exerted by the failed actuator module on the breakout mechanism would be high and so the breakout mechanism would be activated.

In one arrangement of an actuation system according to the disclosure, such as that shown in FIG. 1 for example, a force multiplier link may be provided. In the example shown, the five actuator modules 16 may be positioned within the wing section towards the deepest part thereof and the lever arms 20 of the actuator modules may be connected to a shaft 80. The force multiplier link in the example of FIG. 1 comprises a multiplier lever 82 for each actuator module 16. The multiplier lever 82 extends from the shaft 80 to a rotary driver (which in this example is a common output rail 84) within the hinge 14. As the length of the multiplier lever 82 is significantly greater than that of the lever arm 20, the torque output from an actuator module will be magnified by the force multiplier link to cause a greater torque to act on the common output rail 84. The provision of the force multiplier link also allows the actuator modules to be positioned further away from the hinge 14 than would be possible were no link provided, thus allowing a higher space envelope within the wing section to be used for the actuator modules.

It will be understood that an actuation system according to the disclosure could comprise any desired number of actuator modules to provide a required torque output and redundancy. A common requirement for primary flight controls is the need to maintain a minimum level of performance in the event of a single failure, i.e. the failure of a single actuator module. An example requirement might be to require 100% of positional authority and 60% of load and rate to be provided in the event of a single failure. In traditional systems, these requirements often necessitate designing an actuation system with additional capabilities which are not used during normal operations and which increase the total weight, size and cost of the actuation system. In an actuation system according to the disclosure, the impact of a single actuator module failing may be proportionately less than in traditional actuation systems such that less overcapacity could need to be provided. For example, to maintain 100% of positional authority and 60% of load and rate after a failure of one actuator module, an actuation system according to the disclosure which includes five actuator modules would not need to be designed with any overcapacity to meet these requirements and could potentially tolerate two of the actuator modules failing whilst still meeting the minimum performance requirements.

Further, actuators sized from between at least 500N to greater than 100 kN could be used in an actuation system according to the disclosure. Further, the torque output supplied and the space envelope required by an actuation system according to the disclosure can be readily altered by altering one or more of: the number of actuator modules in the actuation system; the size and capability of one or more of the actuator modules in the actuation system; and the arrangement or layout of the actuator modules in the actuation system. It will be appreciated that actuation systems according to the disclosure could therefore be used in any type of aircraft, including but not limited to, light UAV aircraft and large commercial aircraft such as Jumbo Jets.

The actuator modules may be positioned in a row or line and configured to drive a rotatable component directly or via one or more linkages as in the examples shown. In alternative examples of the disclosure, the actuator modules may be positioned to provide a distributed solution. For example, any suitable number of actuator modules, for example actuator modules 416a-416e shown in FIG. 4, may be positioned in two or more rows 490, 492 joined by suitable linkages 494. In one example, each row may extend substantially parallel to the other rows and be spaced from the other rows in a direction perpendicular thereto. Further, various V, W or radial arrangements of the actuator modules around a shaft may be envisaged. For example, two discrete banks of three actuator modules in a row, for example actuator modules 516a-516c and 516d-516f shown in FIG. 5, may be arranged in a V shape. Alternatively, four actuator modules could be arranged in a row, with two further actuator modules offset therefrom to form a V shape. Such alternative arrangements may allow an actuation system capable of providing a high torque output and a high level of redundancy to be configured to fit within a tight or awkward space envelope (for example where a long single row of actuator modules would not fit into the envelope available).

Further, although the examples described above comprise an output shaft for summing the torque output of the actuator modules, it will be understood that any suitable rotary driver for summing the torque output such as for example, a belt or a chain could be provided in place of the output shaft. Thus, for example, each actuator module could be configured to drive a respective pulley or gear, each pulley or gear then being connected to a common chain or belt to sum the outputs from the respective pulleys or gears. Further, additional linkages provided between an actuation system according to the disclosure and a rotary component to be driven by the actuation system can be rigid or flexible (for example comprising a toothed belt or chain and suitable tensioners). The use of such flexible linkages may provide additional flexibility in packaging an actuation system according to the disclosure into a confined space envelope such as a thin wing of an aircraft.

Still further, although the examples described above are for use in actuating a control surface on an aircraft wing, it will be appreciated that an actuation system according to the disclosure may be used in many other applications where either tolerance for actuator jamming or failure is required or where the maximum size of a single actuator which can be used is limited by the space available. These other applications include but are not limited to the actuation of rudder control surfaces in aircraft or other vehicles.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. An actuation system comprising:
    a rotary driver; and
    three or more actuator modules,
    wherein each actuator module comprises an electromechanical linear actuator including a motor and an actuator arm driven by the motor, and
    wherein each actuator module further comprises a lever arm-connected between the actuator arm and the rotary driver;
    wherein each actuator module is connected to the rotary driver such that the three or more actuator modules are configured to drive rotation of the rotary driver in combination using the sum of the force output from each of the three or more actuator modules;
    wherein the three or more actuator modules are arranged in two or more rows, wherein each of the two or more rows is operably connected to another row by a linkage.

2. An actuation system as claimed in claim 1, wherein each actuator module further comprises a breakout mechanism configured to operably disconnect the actuator module from the rotary driver if a force exerted on the breakout mechanism exceeds a desired value.

3. An actuation system as claimed in claim 2, wherein the breakout mechanism comprises: an overload clutch, a shear pin or a collapsing link.

4. An actuation system as claimed in claim 1, wherein the electromechanical linear actuators in the three or more actuator modules are sized such that a required driving force is supplied to the rotary driver even when one or more of the actuator modules fails or jams.

5. An actuation system as claimed in claim 1, wherein an additional linkage mechanism is provided between the rotary driver and a remote mechanism configured to be actuated by the actuation system.

6. An actuation system as claimed in claim 1, wherein a force multiplier link is provided between each actuator module and the rotary driver.

7. An actuation system as claimed in claim 1, wherein the rotary driver comprises a shaft.

8. An actuation system as claimed in claim 1, wherein the actuation system is an aircraft control surface actuation system.

9. An aircraft wing comprising:
    a control surface adapted to move from a first position to a second position; and
    an actuation system as claimed in claim 1,
    wherein the rotary driver is adapted to drive the movement of the control surface from the first position to the second position.

10. An aircraft wing as claimed in claim 9, wherein the actuation system is housed inside the wing.

* * * * *